No. 628,859. Patented July 11, 1899.
H. A. SÉVIGNÉ.
METHOD OF PRESERVING BREAD.
(Application filed Oct. 26, 1896.)

(No Model.)

WITNESSES:
A. D. Harrison.
P. W. Pezzetti.

INVENTOR:
Henri A. Sévigné
 by Wright Brown & Quinby
Attys.

UNITED STATES PATENT OFFICE.

HENRI A. SÉVIGNÉ, OF BOSTON, MASSACHUSETTS, ASSIGNOR, BY DIRECT AND MESNE ASSIGNMENTS, TO THE SÉVIGNÉ BREAD WRAPPER COMPANY, OF SAME PLACE.

METHOD OF PRESERVING BREAD.

SPECIFICATION forming part of Letters Patent No. 628,859, dated July 11, 1899.

Application filed October 26, 1896. Serial No. 610,036. (No specimens.)

*To all whom it may concern:*

Be it known that I, HENRI A. SÉVIGNÉ, of Boston, in the county of Suffolk and State of Massachusetts, have invented certain new and useful Improvements in Methods of Preserving Bread, of which the following is a specification.

This invention has for its object the provision of an improvement in the art of preserving bread whereby the same may be accomplished expeditiously and economically, and yet efficaciously preserve or protect it against microbes or other germs, as well as from being soiled or befouled by frequent handling or in coming in contact with objectionable things.

To this end the invention consists in the art of preserving bread, embracing the steps of baking it in an oven in which the heat is sufficient to kill all bacteria and germs which might exist in the dough, allowing the bread to cool until it is at a temperature of about 90° Fahrenheit, and then wrapping each loaf in a practically air-tight and waterproof wrapper or covering when the bread is at the temperature aforesaid.

The invention also consists, as a new article of manufacture, of a loaf of bread baked in an oven in which the temperature is sufficient to destroy microbes and bacteria of all the different sorts, cooled to a temperature of about 90° Fahrenheit, and then inclosed within a practically air-tight and waterproof wrapper, all as I shall now proceed to describe in detail and then point out in the claims.

Reference is to be had to the accompanying drawings, and to the letters marked thereon, forming a part of this specification, the same letters designating the same parts or features, as the case may be, wherever they occur.

Figure 1:
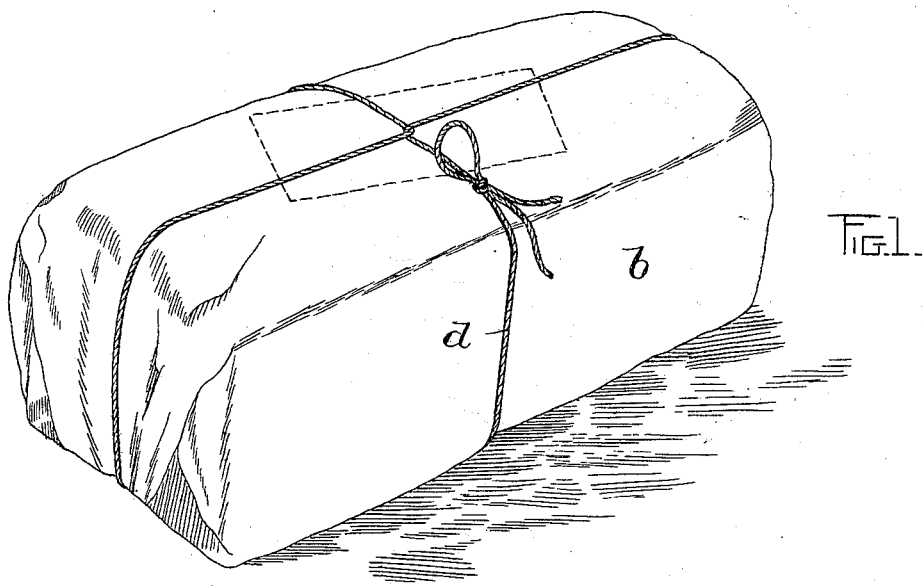
Figure 2:
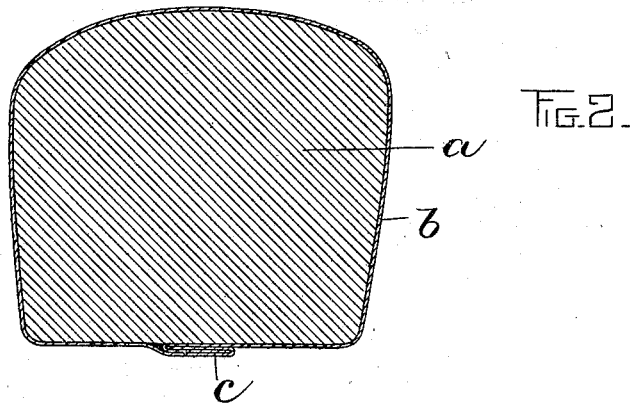

Of the drawings, Figure 1 is a perspective view of a loaf of bread inclosed in a wrapper in accordance with my process. Fig. 2 is a transverse sectional view thereof.

In carrying out my improved process the dough for the bread is mixed in the ordinary way, during which time it is liable to be impregnated with germs of various sorts which are injurious to the human body. After the dough has been sufficiently mixed the loaves are placed in an oven which is heated to a temperature sufficient to bake the bread and at the same time destroy all of the germs and bacteria, and after the bread has been baked it is withdrawn from the oven and allowed to cool until it is at a temperature of 90° to 100° Fahrenheit. Then it is immediately, while at that temperature, inclosed within a wrapper of waxed or paraffined paper or other suitable and practically air-tight and waterproof substance $b$, which is wrapped about it in any desired manner. I may smooth down the lapping edges $c$ if the wrapper be of waxed paper, melting the wax at this point and practically sealing the wrapper on the loaf.

In practice I tie a cord $d$ about the loaf, as represented in Fig. 1, to prevent the wrapper from being displaced or becoming loosened.

One of the greatest objections to the use of bakers' bread has been due to the fact that it has to be handled by several persons whose hands are not apt to be clean, and especially by the driver, who has handled the reins and other portions of the harness of the horse, by means of which the delivery-wagon is drawn, so that the bread not only becomes befouled, but also becomes filled with injurious microbes and bacteria. By this means the bread frequently becomes a medium of transmitting disease, especially during the time when various insects are likely to deposit their eggs upon it, whereas by employing my improved method of preserving the bread I so inclose the latter while it is in its warm state that those chemical changes which take place during the cooling of the bread are retarded, and the bread remains in a "fresh" state for many days beyond what it would without the outer covering. The bread is thoroughly protected from insects and against being befouled or damaged by handling with unclean hands or coming into contact with objectionable and unclean objects.

It has heretofore been proposed to wrap confectionery — such as "caramels," molasses candy, &c. — in paraffined or wax wrappers; but I lay no claim to a wax or paraffined wrapper for use in wrapping candy. My invention is designed to accomplish a result heretofore not attained, and that is the preserving of the purity and the freshness of bread. Bread when exposed to the atmosphere becomes "stale" in a short time—that is, its chemical ingredients are so changed by exposure to the gases of the air that it becomes hard and inedible—whereas when covered by a practically air-tight wrapping the atmosphere is kept away from it, and its chemical qualities are unchanged for a long period of time.

It has been proposed to seal some substances against the entrance of air by dipping them in melted wax or paraffin; but it will be readily seen that bread could not be subjected to that process, inasmuch as the melted wax would enter the pores of the bread and render it unfit for use.

Waxed or paraffined paper not only protects the bread, but is transparent sufficiently to see what kind of bread is inclosed within the wrapper and also to enable a person to read a label inserted between the wrapper and the bread.

Having thus explained the nature of the invention and described a way of constructing and using the same, though without attempting to set forth all of the forms in which it may be made or all of the modes of its use, I declare that what I claim is—

1. The improvement in the art of preserving bread consisting in baking it in an oven heated to a high temperature, removing the bread therefrom and allowing it to cool until it is at a temperature of about 90° Fahrenheit, wrapping each loaf in a practically air-tight and waterproof wrapper before the temperature of the bread is reduced to the normal temperature of the atmosphere, lapping the edges of the wrapper therearound, and securing it upon the bread, substantially as and for the purposes set forth.

2. As a new article of manufacture, a loaf of bread inclosed in a flexible, sealed, air-tight and waterproof wrapper, said wrapper being sufficiently transparent to enable the contents to be identified.

In testimony whereof I have signed my name to this specification, in the presence of two subscribing witnesses, this 23d day of October, A. D. 1896.

HENRI A. SÉVIGNÉ.

Witnesses:
 A. D. HARRISON,
 P. W. PEZZETTI.